US010733669B2

(12) United States Patent
Studnitzer et al.

(10) Patent No.: US 10,733,669 B2
(45) Date of Patent: Aug. 4, 2020

(54) MESSAGE PROCESSING

(75) Inventors: Ari Studnitzer, Northbrook, IL (US); Nathan Ball, Ogden Dunes, IN (US); Wayne G. Arner, II, Northbrook, IL (US); Giuseppe Scimeca, Chicago, IL (US); John Scheerer, Frankfort, IL (US); Christopher Reithel, New Lenox, IL (US); Jacob Doornebos, Riverside, IL (US); Brian Wolf, Roselle, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 986 days.

(21) Appl. No.: 13/564,886

(22) Filed: Aug. 2, 2012

(65) Prior Publication Data

US 2014/0040062 A1 Feb. 6, 2014

(51) Int. Cl.
*G06Q 40/04* (2012.01)
(52) U.S. Cl.
CPC .................. *G06Q 40/04* (2013.01)
(58) Field of Classification Search
CPC .......... G06Q 40/04; G06Q 30/06–08
USPC ......... 705/26.3, 26.1–27.2
See application file for complete search history.

(56) References Cited

U.S. PATENT DOCUMENTS

| 5,371,673 | A | * | 12/1994 | Fan | G06Q 30/02 704/1 |
| 6,029,146 | A | * | 2/2000 | Hawkins | G06Q 40/00 235/379 |
| 6,108,493 | A | * | 8/2000 | Miller | G06Q 40/08 707/999.002 |
| 6,236,980 | B1 | * | 5/2001 | Reese | G06Q 30/02 705/26.1 |
| 6,393,460 | B1 | * | 5/2002 | Gruen | G06Q 10/107 709/204 |
| 6,493,703 | B1 | * | 12/2002 | Knight | G06F 17/30702 |
| 6,571,234 | B1 | * | 5/2003 | Knight | G06Q 10/10 |
| 6,606,644 | B1 | * | 8/2003 | Ford | G06F 17/30864 707/999.003 |
| 6,859,807 | B1 | * | 2/2005 | Knight | G06Q 10/10 |
| 7,072,883 | B2 | * | 7/2006 | Potok | G06F 17/30569 |
| 7,130,777 | B2 | * | 10/2006 | Garg | G06Q 30/0282 703/2 |
| 7,146,416 | B1 | * | 12/2006 | Yoo | G06F 17/30867 707/E17.119 |
| 7,155,510 | B1 | * | 12/2006 | Kaplan | G06Q 30/0202 705/7.31 |
| 7,185,065 | B1 | * | 2/2007 | Holtzman | G06F 17/2745 705/36 R |
| 7,197,470 | B1 | * | 3/2007 | Arnett | G06F 21/31 705/7.29 |
| 7,299,204 | B2 | * | 11/2007 | Peng | G06Q 40/06 705/36 R |

(Continued)

OTHER PUBLICATIONS

Monitoring Data Quality Performance Using Data Quality Metrics with David Loshin (Year: 2006).*

*Primary Examiner* — Ming Shui
(74) *Attorney, Agent, or Firm* — Lempia Summerfield Katz LLC

(57) ABSTRACT

Systems and methods are provided for scoring the use of financial market messages. Uses of messages that are efficient and/or improve market liquidity receive positive scores. Traders are charge fees or receive rewards that are dependent upon message quality scores.

14 Claims, 3 Drawing Sheets

(56) References Cited

U.S. PATENT DOCUMENTS

| | | | | |
|---|---|---|---|---|
| 7,983,952 | B1 * | 7/2011 | Dillon | G06Q 30/02 |
| | | | | 705/26.7 |
| 8,306,904 | B1 * | 11/2012 | Marchini | G06Q 40/04 |
| | | | | 705/37 |
| 8,566,222 | B2 * | 10/2013 | Hendrix | G06Q 40/06 |
| | | | | 705/37 |
| 8,843,563 | B1 * | 9/2014 | Hartman | G06Q 10/06 |
| | | | | 709/206 |
| 2005/0109830 | A1 * | 5/2005 | Liberti | G06F 16/9535 |
| | | | | 235/375 |
| 2008/0306880 | A1 * | 12/2008 | Legatz | G06Q 40/02 |
| | | | | 705/36 R |
| 2010/0042570 | A1 * | 2/2010 | Mayers | H04L 51/00 |
| | | | | 706/46 |
| 2010/0257117 | A1 * | 10/2010 | Shvadron | G06Q 10/04 |
| | | | | 705/36 R |
| 2011/0184844 | A1 * | 7/2011 | Parsons | G06Q 40/00 |
| | | | | 705/35 |
| 2012/0185410 | A1 * | 7/2012 | Hendrix | G06Q 40/06 |
| | | | | 705/36 R |
| 2012/0239650 | A1 * | 9/2012 | Kim | G06F 16/355 |
| | | | | 707/737 |
| 2014/0236800 | A1 * | 8/2014 | Buck | G06Q 40/04 |
| | | | | 705/37 |

* cited by examiner

MESSAGE PROCESSING

FIELD OF THE INVENTION

Aspects of the present invention relate to the processing of financial market messages. More specifically, aspects of the present invention provide systems and methods for determining characteristics relating to the use of messages.

BACKGROUND

Current financial instrument trading systems allow traders to transmit messages to submit new orders, cancel existing orders and modify existing orders. Typically trade engines process each individual message and create corresponding market data messages. Market data messages are transmitted to traders and other entities. Existing systems provide traders and other users with several options regarding the use of messages. For example, if a trader wishes to change the price of an existing order for a financial instrument, the user can submit a modify order message or submit a cancel order message and a new order message. Choices made by traders impact the number of messages required to implement trading strategies.

Message traffic can strain computer systems and networks that are used to transmit such messages. The processing of messages and associated overhead consumes bandwidth and processing time. Large numbers of messages also have corresponding large memory and storage requirements.

Therefore, there is a need in the art for improved systems and methods for monitoring messages and providing incentives for the efficient or optimized use of messages.

SUMMARY OF THE INVENTION

Embodiments of the invention overcome at least some of the problems and limitations of the prior art by providing systems and methods for evaluating or scoring financial market messages. Messages that are efficient and/or improve liquidity are scored accordingly. An exchange or other trading entity may charge a fee or provide a reward that is dependent on the message score.

In various embodiments, aspects of the present invention can be partially or wholly implemented on a computer-readable medium, for example, by storing computer-executable instructions or modules, or by utilizing computer-readable data structures.

Of course, the methods and systems disclosed herein may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Figure 1:
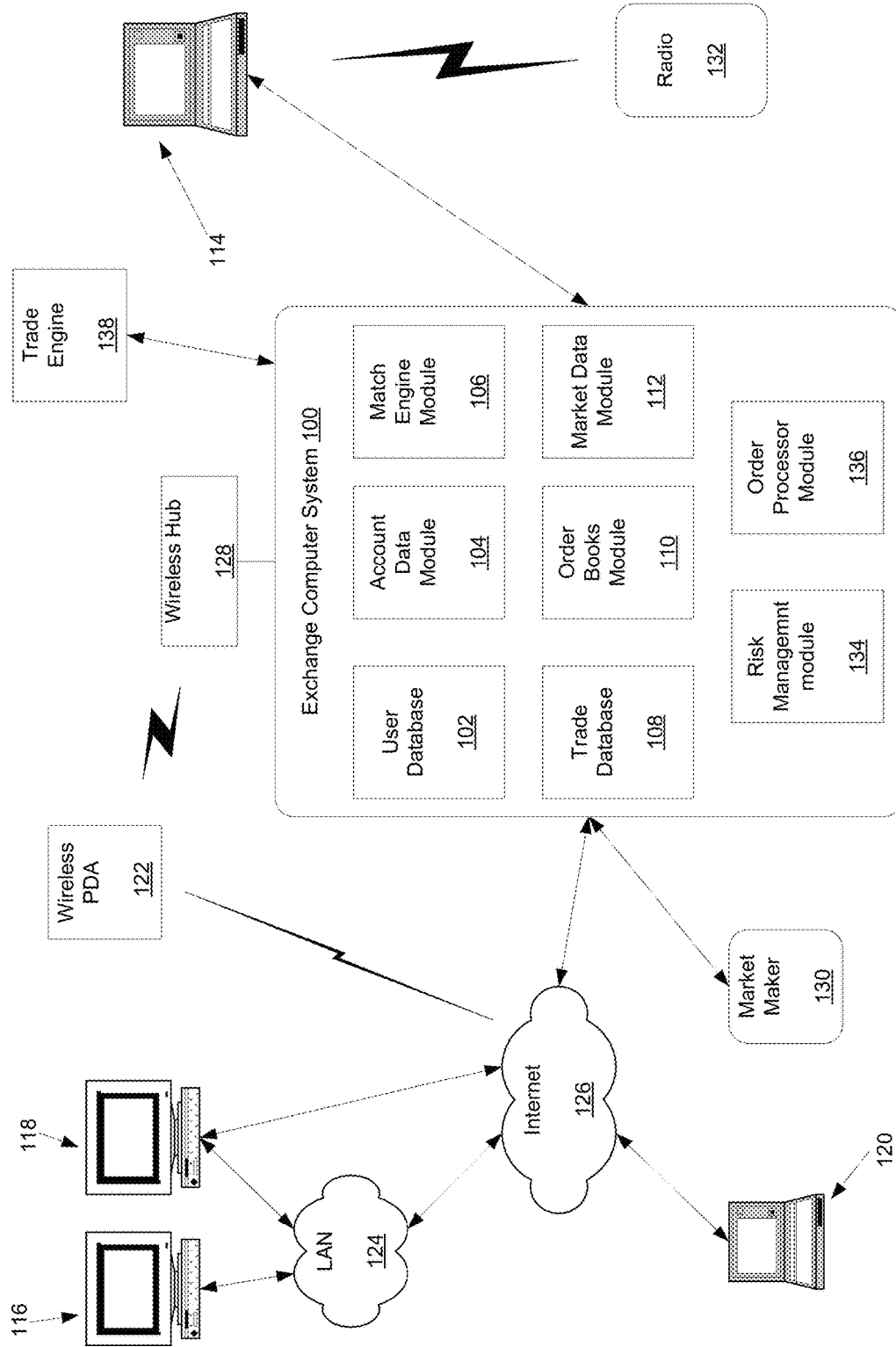
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.)

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
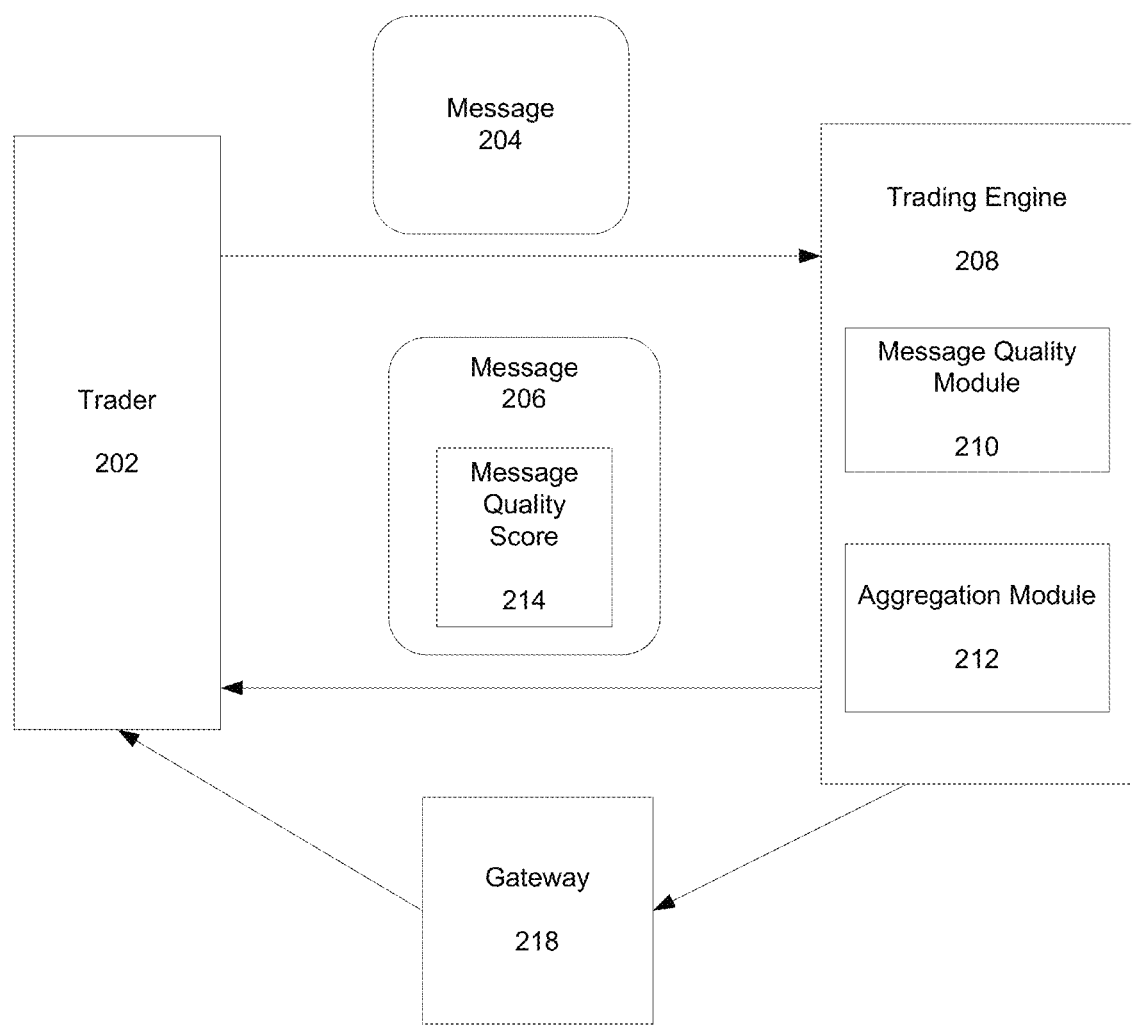
FIG. 2 illustrates a system for processing financial market messages in accordance with an embodiment of the invention.

FIG. 2 illustrates a system for processing financial market messages in accordance with an embodiment of the invention. A trader 202 exchanges messages 204 and 206 with a trading engine 208. Trader 202 may be an individual, firm or other entity that trades financial instruments. Message 204 may be a buy order message, cancel order message, modify order message, mass quote message or any other type of message typically sent from a trader to a trading engine. Trading engine 208 may reside at an exchange and may perform some or all of the functions performed by exchange computer system 100 (shown in FIG. 1). Trading engine 208 may receive messages from traders, process those messages and transmit corresponding return messages. For example, trading engine 208 may receive a buy order message, process the message and transmit an acknowledgement message.

Trading engine 208 may include a message quality module 210. Message quality module 210 may be implemented with software and/or hardware to score or evaluate messages received from traders and to generate a message quality score. Message quality scores may be used to quantify how efficiently traders are using message types and/or the impact that a message has on market liquidity. In one embodiment message values are assigned according to message type. For example, a new order message may have a message value of 0, a cancel order may have a message value of 1 and a modify order message may have a message value of 0.3. The use of a modify order message is often more efficient than the use of the combination of a cancel order message and a new order message. Accordingly, the message value of a modify order message may be less than the average of a cancel order message and a new order message. In various alternative embodiments message quality scores are also a function of message size. For example, a large order may add to liquidity and not increase a message quality score.

Various other algorithms and weighting methods may be used to generate message quality scores. Message quality scores may be functions of factors such as changes in price levels, size, time in the market, market and combinations. Weights may also be assigned to each factor and one or more weights may be a function of other factors. Message quality scores may be a weighted sum of factors or other combination of weighted or unweighted factors.

Trading engine 208 may include an aggregation module 212. Aggregation module 212 may be configured to aggregate message quality scores by individual traders, firms and/or other trading entities. Aggregation may also be performed for time periods, such as by trading session or month. Trading engine 208 may also be configured to distribute message quality scores. In some embodiments a message quality score 214 is included as part of return message 206. Message quality score 214 may be for an individual message or may be an aggregated score for a trading entity or may be used in a downstream system to gate available capacity for a user. Distributing message quality scores facilitates accurately tracking message scores by traders.

In some embodiments a gateway 218 may be included between trader 202 and trading engine 208. Gateway 218 may perform various functions, such as volume control checks, calculating message quality scores and transmitting message quality scores.

In one embodiment message quality scores are determined by the following equation:

$$\text{Message quality} = A*\Delta\text{Price level} + B*\text{Size} + C*\Delta\text{Time} \quad \text{(Equation 1)}$$

Wherein
A, B and C=constants per product
$\Delta$Price level=change in price level
Size=order size
$\Delta$Time=time in the market The change in price level factor may correspond to a change in dollar amounts. For example, modifying an order from a price level of $15 per contract to a price level of $17 per contract would have a change in price level of $2 per contract. Change in price levels may also factor in order quantity. For example, if the order had a volume of 50 contracts, the change in price level may be $2 per contract multiplied by the volume of 50 contracts or $100. Alternatively, the change in price level factor may be determined in relation to a best bid or best offer. As the best bid and best offer move the change in price level represents the change in dollar amount or ticks from the best bid or best offer. For example, if an order is at one tick level below a best bid and the market moves, modifying the order to remain one tick level below the new best bid would be considered no change in price level.

The time in the market factor may be used to reward traders for leaving orders in a market for longer periods of time. Orders that remain in the market for longer time periods may add to market liquidity and may decrease the capacity load needed to process the order and subsequent market data.

In some embodiments messages that include order sizes that exceed a threshold do not add to message quality scores. Of course, a tiered approach or an adjustment favorable to a trader to the message quality score may also be used in other embodiments. Various message quality scoring algorithms may also factor in distances from a best bid or best offer. Orders that are further away from a best bid or best offer may only marginally add to liquidity.

Figure 3:
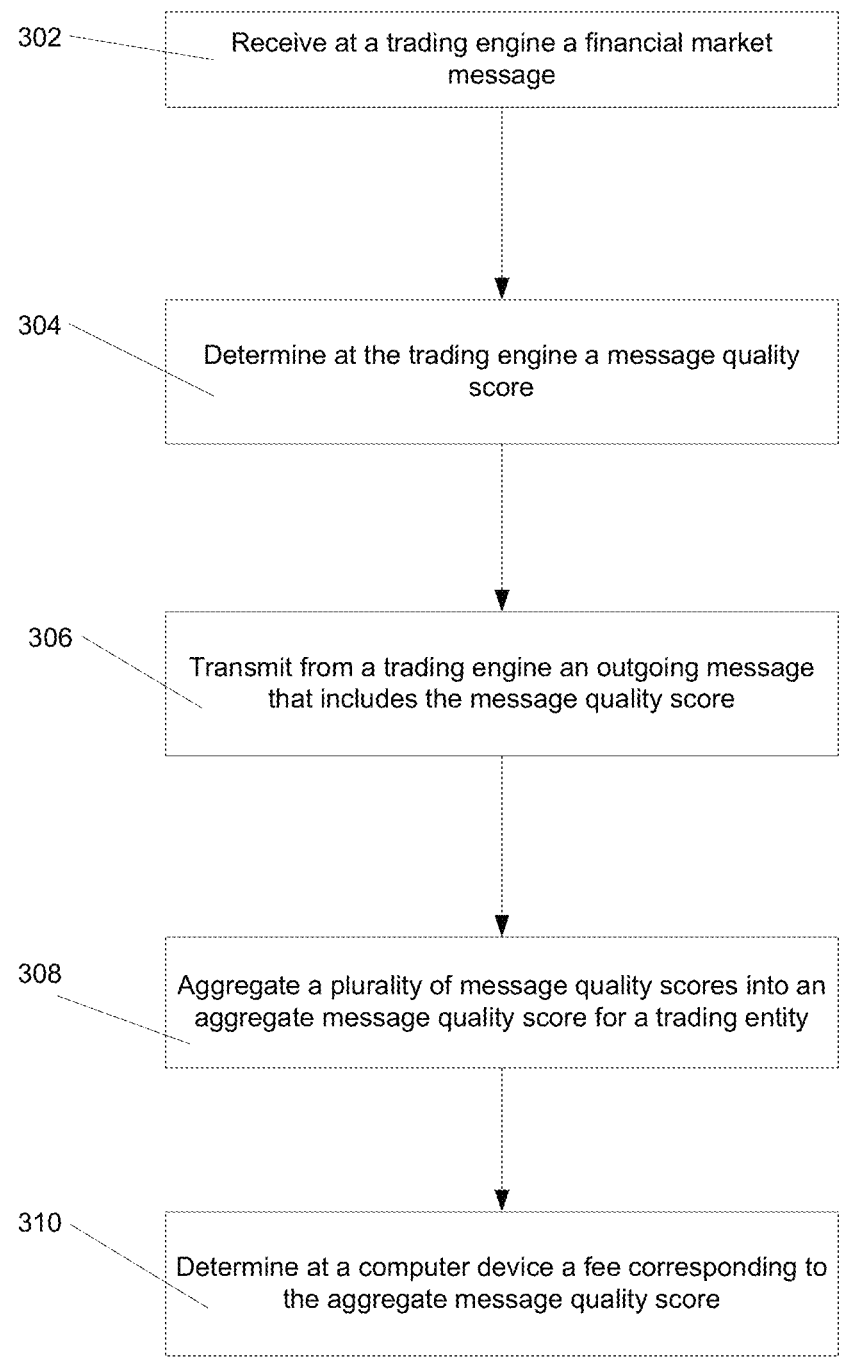
FIG. 3 illustrates a method for processing financial market messages in accordance with an embodiment of the invention.

FIG. 3 illustrates a method for processing financial market messages in accordance with an embodiment of the invention. First, in step 302 a trading engine receives a financial market message. The message may be a buy order message, cancel order message, modify order message or any other type of message typically sent from a trader to a trading engine. Next, in step 304, the trading engine determines a message quality score. The determination may use one or more of the algorithms discussed above. In alternative embodiments the determination is performed by a component other than the trading engine. After the determination, the trading engine transmits an outgoing message that includes the message quality score in step 306. Message quality scores may alternatively be transmitted to multiple devices or used by the trading engine or an exchange computer device.

The method shown in FIG. 3 may be used in embodiments that aggregate messages by trading entities. In step 308, a plurality of message quality scores are aggregated into an aggregate message quality score for a trading entity. An exchange or other trading entity may charge a fee or provide a discount that is a function of a message quality score. An exchange may also base volume controls as a function of the message quality score adding or removing message capacity. In step 310 a computer device determines a fee corresponding to the aggregate message quality score. Information regarding the fee may be distributed as part of a message, such as message 206.

In some embodiments that utilize volume controls, an exchange or other trading entity may facilitate the trading of excess capacity. Trading entities may buy and sell volume subject to volume controls or message quality scores. Such embodiments may allow trading entities to profit from the efficient use of messaging, which encourages the efficient use of messaging.

The present invention has been described in terms of preferred and exemplary embodiments thereof. Numerous other embodiments, modifications and variations within the scope and spirit of the invention will occur to persons of ordinary skill in the art from a review of this disclosure. For example, aspects of the invention may be used to process and communicate data other than market data.

We claim:

1. A system comprising:
a communication network;
a trading engine, communicatively coupled with the communication network, that receives a market data message from a trader and comprises:
 a hardware message quality module of the trading engine containing a first computer-readable medium containing computer-executable instructions, that when executed, determine a message quality score that quantifies an efficiency of the market data message, wherein the efficiency is measured by a message type of the market data message, wherein the message quality score is assigned a value of:
 0 when the message type is a new order message type,
 1 when the message type is a cancel order message type, and
 0.3 when the message type is a modify order message type;
wherein the trading engine further comprises a second computer-readable medium containing computer-executable instructions that when executed cause the trading engine to perform the steps comprising:
 (a) transforming an outgoing message to insert the message quality score into the outgoing message, wherein the outgoing message is an acknowledgment message that acknowledges processing of the market data message at the trading engine;
 (b) transmitting from the trading engine over the communications network coupled therewith, the transformed outgoing message; and
 (c) determining a message volume control limit as a function of the message quality score and adding or removing message capacity based thereon; and
wherein the system further comprises:
 a gateway communicatively coupled with the communications network and including a computer-readable medium containing computer-executable instructions that when executed cause the gateway to perform the steps comprising:
 (a) receiving the transformed outgoing message from the trading engine via the communications network;
 (b) performing volume control checks; and
 (c) transmitting the message quality score of the received transformed outgoing message to the trader.

2. The system of claim 1, wherein the market data message comprises an order for a derivative product.

3. The system of claim 1, wherein the message quality score corresponding to the modify order message type is less than an average of the message quality score corresponding to the new order message type and the message quality score corresponding to the cancel order message type.

4. The system of claim 1, wherein the message quality score further comprises a function of a change in price level from a best bid or a best offer.

5. The system of claim 4, wherein the message quality score increases as a price level moves away from a best bid or best offer.

6. The system of claim 4, wherein the message quality score comprises a function of an order size.

7. The system of claim 6, wherein the message quality score increases as the order size decreases.

8. The system of claim 6, wherein the message quality score comprises a function of a time that an order has been in a market corresponding to the market data message received at the trading engine.

9. The system of claim 8, wherein the message quality score for the new order message type decreases as an order has been in the market longer.

10. The system of claim 8, wherein the message quality score is a weighted sum of:
the change in the price level;
the order size; and
the time that the order has been in the market.

11. The system of claim 10, wherein weights used in the weighted sum are a function of the market.

12. The system of claim 11, wherein the weights used in the weighted sum are a function of market activity in the market.

13. The system of claim 1, wherein the trading engine further includes an aggregation module that aggregates a plurality of message quality scores into an aggregate message quality score for a trading entity.

14. The system of claim 13, further including:
a computer device that determines a fee corresponding to the aggregate message quality score.

* * * * *